US012758868B2

(12) United States Patent
Osman et al.

(10) Patent No.: US 12,758,868 B2
(45) Date of Patent: Oct. 13, 2026

(54) TEXT MESSAGE OR APP FALLBACK DURING NETWORK FAILURE IN A VIDEO GAME

(71) Applicant: Sony Interactive Entertainment Inc., Tokyo (JP)

(72) Inventors: Steven Osman, San Francisco, CA (US); Olga Rudi, San Francisco, CA (US); Frank Lin, San Mateo, CA (US); David Coles, San Mateo, CA (US); Chockalingam Ravi Sundaram, San Mateo, CA (US); Coimbatore Ravi Madhavan, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 509 days.

(21) Appl. No.: 18/134,741

(22) Filed: Apr. 14, 2023

(65) Prior Publication Data

US 2024/0115940 A1 Apr. 11, 2024

Related U.S. Application Data

(60) Provisional application No. 63/414,420, filed on Oct. 7, 2022.

(51) Int. Cl.
*A63F 13/335* (2014.01)
*A63F 13/355* (2014.01)

(52) U.S. Cl.
CPC .......... *A63F 13/335* (2014.09); *A63F 13/355* (2014.09)

(58) Field of Classification Search
CPC ............................. A63F 13/335; A63F 13/355
See application file for complete search history.

(56) References Cited

U.S. PATENT DOCUMENTS 9,159,189 B2 * 10/2015 Froy, Jr. ................ A63F 13/493
10,238,965 B2 * 3/2019 Colenbrander ......... H04L 67/01
10,688,390 B2 * 6/2020 Butler ................ H04N 21/4788
10,773,168 B2 * 9/2020 Rodgers .................. A63F 13/50
11,213,746 B2 * 1/2022 Musbah ................ A63F 13/422
(Continued)

FOREIGN PATENT DOCUMENTS

WO 2019195169 A1 10/2019

OTHER PUBLICATIONS

PCT/US2023/074008 Notification of Transmittal of the International Search Report and the Written Opinion of the International Searching Authority, or the Declaration, PCT/ISA/220, and the International Search Report, PCT/ISA/210, Jan. 2, 2024.

*Primary Examiner* — Ankit B Doshi
(74) *Attorney, Agent, or Firm* — Kilpatrick Townsend & Stockton LLP

(57) ABSTRACT

A method for managing gameplay of a video game is provided, including: executing a session of a video game by a cloud gaming resource; streaming video generated by the session over a network to a client device associated to a player of the video game, to enable gameplay of the session by the player; detecting a loss of network connectivity between the client device and the session; responsive to detecting the loss of network connectivity, then initiating transmission of updates regarding the session, via an alternative communication channel, to a secondary device associated to the player.

20 Claims, 6 Drawing Sheets

(56) References Cited

U.S. PATENT DOCUMENTS

| | | | | |
|---|---|---|---|---|
| 2007/0021216 | A1* | 1/2007 | Guruparan | A63F 13/493<br>463/43 |
| 2008/0268959 | A1* | 10/2008 | Bryson | G07F 17/3227<br>463/25 |
| 2017/0312626 | A1* | 11/2017 | Colenbrander | H04L 67/10 |
| 2017/0323470 | A1* | 11/2017 | Babatunde | A63F 13/35 |
| 2019/0217191 | A1 | 7/2019 | Colenbrander | |
| 2019/0321727 | A1* | 10/2019 | Rodgers | A63F 13/335 |
| 2019/0351321 | A1* | 11/2019 | Fear | A63F 13/493 |
| 2020/0206614 | A1 | 7/2020 | Colenbrander | |
| 2020/0306643 | A1* | 10/2020 | Borovikov | A63F 13/67 |
| 2021/0113921 | A1* | 4/2021 | Musbah | A63F 13/355 |
| 2022/0168635 | A1 | 6/2022 | Musbah et al. | |
| 2023/0033340 | A1* | 2/2023 | Cary | G06F 9/452 |

* cited by examiner

TEXT MESSAGE OR APP FALLBACK DURING NETWORK FAILURE IN A VIDEO GAME

CLAIM OF PRIORITY

This application claims priority under 35 U.S.C. 119(e) to U.S. Provisional Patent Application No. 63/414,420, filed Oct. 7, 2022, and entitled "TEXT MESSAGE OR APP FALLBACK DURING NETWORK FAILURE IN A VIDEO GAME," the disclosure of which is incorporated herein by reference in its entirety for all purposes.

1. FIELD OF THE DISCLOSURE

The present disclosure relates generally to methods, systems and devices for text message or app fallback when network failure occurs during a video game.

BACKGROUND

2. Description of the Related Art

The video game industry has seen many changes over the years. As technology advances, video games continue to achieve greater immersion through sophisticated graphics, realistic sounds, engaging soundtracks, haptics, etc. Players are able to enjoy immersive gaming experiences in which they participate and engage in virtual environments, and new ways of interaction are sought. Furthermore, players may stream video of their gameplay for spectating by spectators, enabling others to share in the gameplay experience.

It is in this context that implementations of the disclosure arise.

SUMMARY

Implementations of the present disclosure include methods, systems and devices for text message or app fallback when network failure occurs during a video game.

In some implementations, a method for managing gameplay of a video game is provided, including: executing a session of a video game by a cloud gaming resource; streaming video generated by the session over a network to a client device associated to a player of the video game, to enable gameplay of the session by the player; detecting a loss of network connectivity between the client device and the session; responsive to detecting the loss of network connectivity, then initiating transmission of updates regarding the session, via an alternative communication channel, to a secondary device associated to the player.

In some implementations, the updates are configured to describe gameplay activity occurring in the session during the loss of network connectivity between the client device and the session.

In some implementations, the updates are generated by detecting predefined gameplay events in the session, and generating messages using corresponding predefined message templates.

In some implementations, the secondary device is a cellular phone or mobile device.

In some implementations, the alternative communication channel is defined by a text messaging service, and wherein the updates include text messages sent via the text messaging service to the secondary device.

In some implementations, the alternative communication channel is defined by messaging via an app installed on the cellular phone or mobile device.

In some implementations, further responsive to detecting the loss of network connectivity, then initiating receiving of game commands, via the alternative communication channel, from the secondary device, and applying said game commands in the session to enable continued gameplay by the player.

In some implementations, the session of the video game is defined for multiplayer gameplay, the multiplayer gameplay continuing during the loss of network connectivity between the client device and the session.

In some implementations, further responsive to detecting the loss of network connectivity, then initiating an autoplay mode to perform automatic gameplay on behalf of the player.

In some implementations, the autoplay mode is configured to automatically move an avatar of the player away from other avatars in a virtual environment defined by the session.

In some implementations, a non-transitory computer-readable medium is provided having program instructions embodied thereon that, when executed by at least one server computer, cause said at least one server computer to perform a method for managing gameplay of a video game, including the following operations: executing a session of a video game by a cloud gaming resource; streaming video generated by the session over a network to a client device associated to a player of the video game, to enable gameplay of the session by the player; detecting a loss of network connectivity between the client device and the session; responsive to detecting the loss of network connectivity, then initiating transmission of updates regarding the session, via an alternative communication channel, to a secondary device associated to the player.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

The following implementations of the present disclosure provide methods, systems and devices for text message or app fallback when network failure occurs during a video game.

The rise of the Internet has facilitated multiplayer gaming between players that may be remotely situated from each other on a widespread scale. However, participation in such multiplayer video games is generally dependent upon one having sufficient network connectivity. In the event of a loss of network connectivity for a given player, then the player may no longer be able to participate in the game. Some games require substantial real-time interactivity and even limited drops in connectivity that negatively impact latency can render a player unable to effectively play.

However, implementations of the present disclosure provide methods and systems that enable a continued gaming experience when a player loses network connectivity, by leveraging an alternative communication route. For example, if a player's console/gaming PC loses connectivity to the game cloud, but the player has access to a low bandwidth system (e.g. cell service to a cellular phone) not capable of streaming, the game could fall back to sending text messages or using simple phone app features to provide updates regarding gaming activity and answer gameplay questions/decision points until the player's primary connection is restored.

With the above overview in mind, the following provides several example figures to facilitate understanding of the example embodiments.

Figure 1:
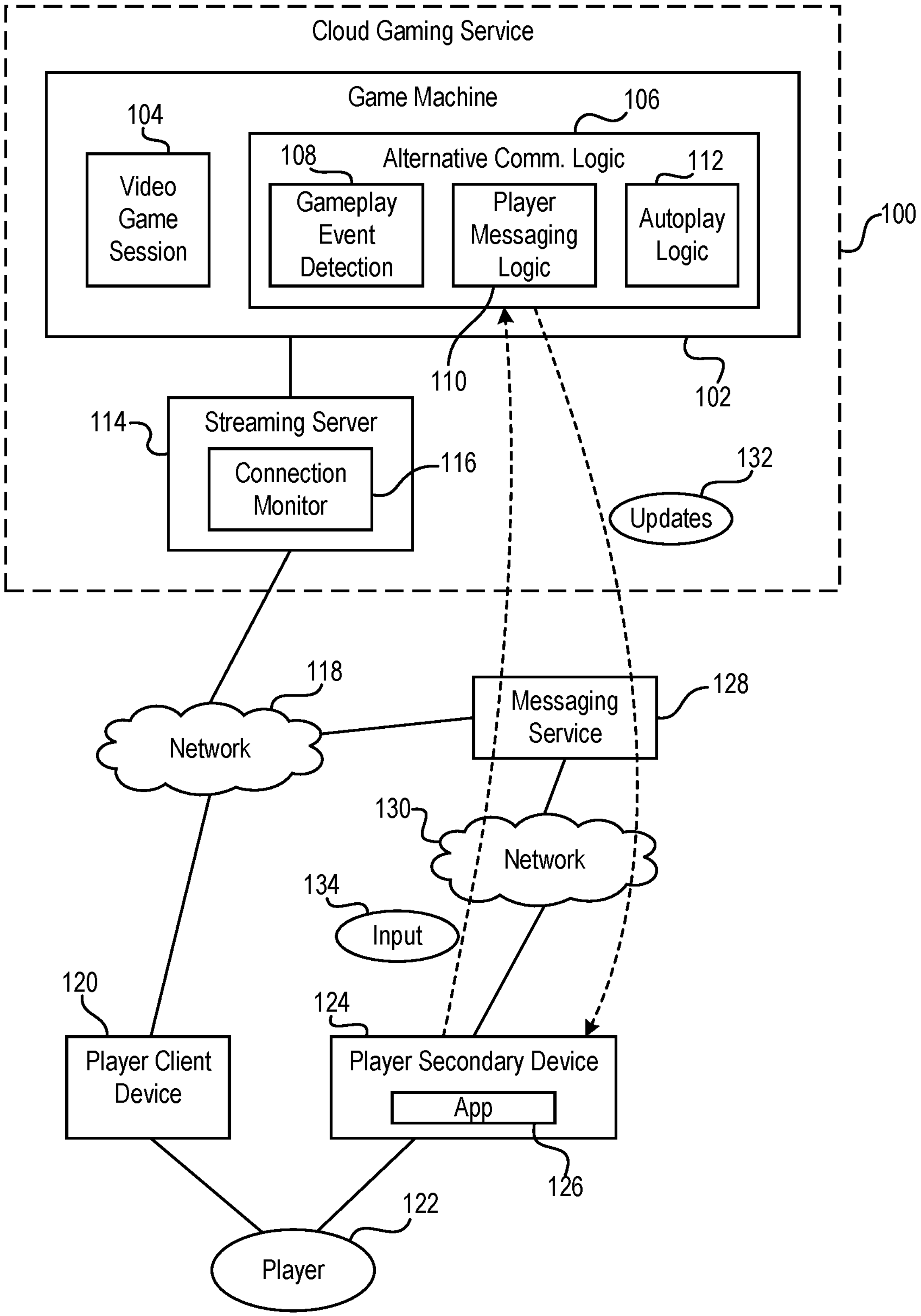
FIG. 1 conceptually illustrates a system for providing cloud gaming with alternative communication in the event of network loss, in accordance with implementations of the disclosure.

FIG. 1 conceptually illustrates a system for providing cloud gaming with alternative communication in the event of network loss, in accordance with implementations of the disclosure.

In the illustrated implementation, a cloud gaming service 100 is provided to enable cloud gaming, in which broadly speaking, a video game is executed in a cloud resource, and gameplay is streamed to a player's local client. Generally, in cloud gaming, gameplay video is rendered in the cloud and streamed to the clients. However, in other implementations the video can be locally rendered at each player's local client device, while the execution of the game state is maintained in the cloud. In still other implementations, execution of the game and/or rendering of video can be partially performed in the cloud and/or the local clients.

With continued reference to FIG. 1, a video game session 104 is executed by a game machine 102. The game machine 102 can be a cloud resource having at least a memory and processor for storage and execution of program instructions of the video game. In some implementations, execution of the video game session 104 includes rendering of gameplay video, that may be further processed (e.g. compressed) by a streaming server 114 for distribution over a network 118 to a player client device 120 that is operated by a player 122. Examples of player client device 120 include a game console, personal computer, laptop, tablet, set-top box, mobile device, streaming device, or other device capable of streaming gameplay as presently described. The player client device 120 may include, or be connected to, a display on which the gameplay video is presented, such as a television, monitor, LCD/LED display, projector, etc.

As the player engages in gameplay of the video game session 104, the player may provide inputs that are transmitted over the network 118 back to the video game session 104. Such inputs can be generated from player interaction with a controller device or other input device. The inputs are applied to the video game session as commands for the gameplay.

It will be appreciated that the video game session 104 can be a multiplayer session, and there may be a plurality of player client devices and associated players that participate in the video game session 104. As noted above, the player's 122 effective participation in the video game will be dependent on the maintenance of a stable connection to the network 118 with sufficient bandwidth to provide a quality gaming experience. However, if connectivity is lost or deteriorates to a point where effective gaming participation is no longer possible, then in the illustrated implementation, alternative communication is activated to enable continuity of the gaming experience for the player 122.

In some implementations, a connection monitor 116 is implemented by the streaming server 114 to monitor the quality of the network connection (e.g. bandwidth, bitrate, or other measures of network connection quality) to the player client device 120. If the quality of the network connection falls below a certain threshold necessary for effective gaming, then alternative communication logic 106 is activated to provide an another way of continuing the gaming experience despite the loss of network connectivity.

In some implementations, though the player 122 may no longer have a sufficient quality connection over network 118, they may have access to a different network 130 through a player secondary device 124. For example, the network 130 can be cellular network or other alternative network pathway, and the player secondary device 124 can be a cellular phone or other device (e.g. mobile device, tablet, etc.) capable of accessing the network 130. This alternative connectivity (and the player secondary device 124) of the player 122 may not be capable of supporting normal streaming of gameplay of the video game session 104, but can nonetheless be leveraged to provide continued communications regarding the video game session 104 in the event of network connectivity loss through the regular network 118.

In some implementations, player messaging logic 110 is implemented to provide game updates 132 over the network 130 to the player secondary device 124. In some implementations, the game updates 132 are in the form of messages communicated via a messaging service 128 over the network 130 to the player secondary device 124 for presentation through an app 126 implemented at the device 124. In some implementations, the messages are text messages (e.g. SMS, MMS, etc.), wherein the messaging service 128 is a text messaging service, and the player secondary device 124 is a cellular phone or other device capable of text messaging (e.g. tablet, mobile device, etc.), and the app 126 is a text messaging app. In other implementations, the messaging service provides another form of messaging such as a social media messaging service or another app-based messaging service, and the app 126 is a social media app or another communication app.

It will be appreciated that the game updates 132 are configured to provide information about the ongoing gameplay of the video game session 104. For example, the game updates 132 can include by way of example without limitation, descriptions of events occurring in the gameplay, activity of various players, changes in scenes/levels/environments, creation/destruction of objects, player death/ spawning, achievements, use/deployment of a resource/item/skill, unlocking/opening/accessing regions, movements, etc.

In some implementations, gameplay event detection logic 108 is implemented to monitor the gameplay activity occurring in the session 104 and detect events such as those described above. Upon the detection of such an event, then a corresponding game update 132 is transmitted as has been described.

It will be appreciated that to enable alternative communication regarding a game session as presently described, the player will have previously configured the cloud gaming service (e.g. their user account in the cloud gaming service) and/or their secondary device 124 to enable the communication of game updates 132. For example, in some implementations, the player's account is configured with the phone number or other account/address of the player where the player may receive text messages or other types of messages. And accordingly, when the alternative communication logic 106 is activated, the player's account is accessed to determine where the game updates 132 should be sent. In some implementations, the player's secondary device 124 is set up by installing and configuring the app 126 to enable receiving the game updates 132.

In addition to receiving game updates 132, in some implementations, the alternative communication logic 106 is configured to enable the player 122 to provide game inputs 134 back to the video game session 104. This can enable the player 122 to continue to direct their gameplay in at least a limited manner despite the loss of their normal network connectivity through network 118. For example, in implementations in which text messaging is utilized to provide the game updates 132, the player, via player secondary device 124 and app 126, may send text messages as game inputs 134 back to the player messaging logic 110, and such text messages can be interpreted and applied as commands to the video game session 104. It will be appreciated that other types of messaging services can be utilized in a similar manner to enable inputs 134 to be provided via the player secondary device 124 in the event of loss of normal network connectivity.

In some implementations, game updates may include instructions regarding how to provide such game inputs. For example, a specific game update message may present the player 122 with a yes/no question or otherwise present a plurality of options, and further provide instruction regarding how to respond or select a given option (e.g. "Reply Y to indicate yes, or N to indicate no"; "Reply A, B, or C, to respectively choose option A, B, or C"; etc.). In some implementations, a game update message may ask the player 122 a question or otherwise request the player to make a gameplay decision of some kind. In some implementations, the player can provide instructions using keywords or numbers or symbols. In some implementations, the player can provide instructions using natural language, and natural language processing can be employed to interpret the instructions so that they may be applied as input to the video game session 104.

In some implementations, the app 126 is configured to include mechanisms for providing inputs 134. For example, the app 126 can be configured to render an interface including buttons or other controls that enable the player 122 to generate the game inputs 134. In some implementations, the interface can include various kinds of game commands, such as movements, actions, decisions, etc.

It will be appreciated that when a player loses connectivity in the context of gameplay, they may become vulnerable to attack, or otherwise at risk of losing/dying or other harmful/detrimental/negative effects as the gameplay (e.g. by other players/characters) continues while they are unable to participate normally. Therefore, in some implementations, an autoplay logic 112 is triggered when the player loses connectivity via their normal network 118. The autoplay logic 112 is configured to automatically perform actions on behalf of the player that will protect the player from such harmful effects.

For example, in some implementations, the autoplay logic 112 is configured to move the player's avatar/character away from danger, such as moving away from a location where there is intense activity or fighting. In some implementations, the autoplay logic 112 implements a protective mode for the player's avatar so that the player's avatar is less susceptible to damage or does not sustain damage, or is not killed or otherwise destroyed while the player's network connectivity is lost. In some implementations, the player's avatar is rendered with some kind of indication (e.g. flashing, transparency, halo, changed color/appearance, labeling, etc.) in the game world so that other players know that the player has lost network connectivity. In some implementations, the autoplay logic 112 implements an artificial intelligence (AI) model (e.g. of the player 122) to perform gameplay actions on behalf of the player 122.

Figure 2:
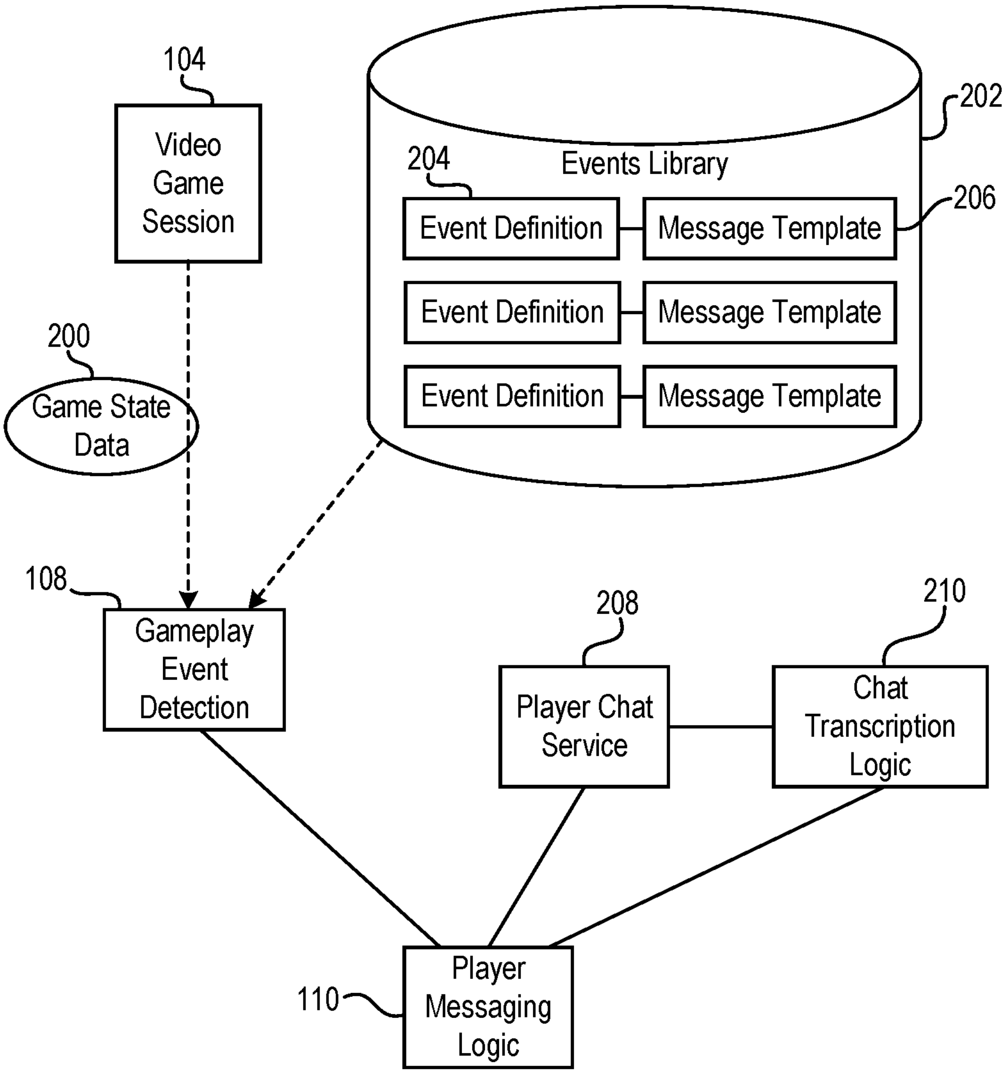
FIG. 2 conceptually illustrates detection of events occurring in gameplay of a video game session, in accordance with implementations of the disclosure.

FIG. 2 conceptually illustrates detection of events occurring in gameplay of a video game session, in accordance with implementations of the disclosure.

As noted above, gameplay event detection logic 108 is configured to detect events occurring in the video game session 104, and when such events are detected, then the player messaging logic 110 generates a message to the player's secondary device as previously described. In some implementations, the gameplay event detection logic 108 analyzes game state data 200 of the video game session 104, and identifies predefined events based on definitions stored to an events library 202. For example, an event definition 204 as shown in the illustrated implementation, is configured to define parameters of a given event which when recognized in the game state data 200, indicate the occurrence of the given event.

It will be appreciated that it may not be feasible to provide updates regarding all activity occurring in the video game session, and therefore, it is preferable to provide updates regarding specified or otherwise significant activity. Accordingly, event definitions can be configured to define which activity is considered significant, the occurrence of which will be reported to the player. Examples can include activity occurring within a predefined distance of the player's avatar in the game's virtual environment, activity that would be visible in the player avatar's view of the virtual environment, acquisition/depletion/use of or changes in a virtual resource/currency exceeding a predefined threshold, events causing changes in points/score exceeding a predefined threshold, movements exceeding a predefined threshold, etc.

In some implementations, the event definition 204 is associated to a corresponding message template 206, which defines a template for generating the message describing the given event when detected in accordance with the event definition 204.

In addition to generating messages regarding specific detected gameplay events, in some implementations, other types of game-related information can be provided to the player via their secondary device. For example, in some implementations, the video game may have a related player chat (e.g. text or voice chat) facilitated by a player chat service 208. In some implementations, the player messaging logic 110 receives the players' chat messages from the player chat service 208, and transmits the players chat messages to the player's secondary device. In the case of a player voice chat in which players' speech/audio is shared between players by the player chat service 208, in some implementations, a chat transcription logic 210 performs speech recognition of the players' speech/audio in order to transcribe the players' voice chat to a text format, and the text transcription is transmitted by the player messaging logic 110 to the player's secondary device.

In this manner, the player 122 may continue to be apprised of player chat activity while experiencing loss of network connectivity through their regular network connection. In some implementations, the player 122 may also continue to participate in player chats by sending messages via their secondary device, which are added to the player chat. In some implementations, such chat messages are received from the player secondary device by the player messaging logic 110 and communicated to the player chat service 208 for distribution to the other players.

Figure 3:
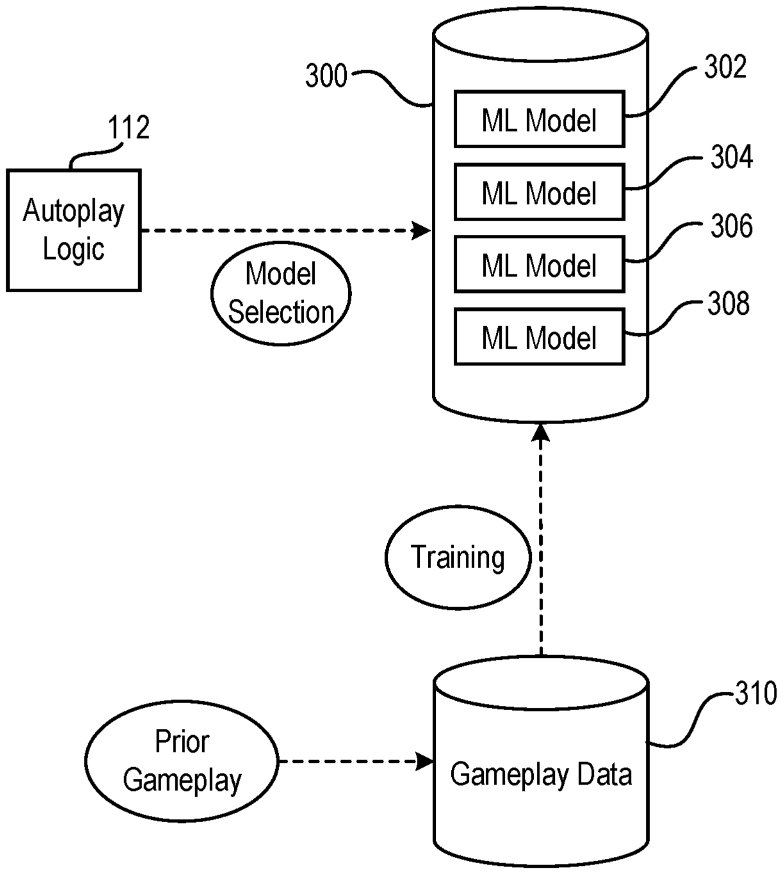
FIG. 3 conceptually illustrates use of a machine learning model to perform autoplay during loss of network connectivity, in accordance with implementations of the disclosure.

FIG. 3 conceptually illustrates use of a machine learning model to perform autoplay during loss of network connectivity, in accordance with implementations of the disclosure.

As noted previously, autoplay logic 112 can be configured to implement an AI in the form of a trained machine learning model. For example, in the illustrated implementation, gameplay data 310 from prior gameplay by the player 122 is processed and used as training data to train one or more machine learning (ML) models. In the illustrated implementation, several ML models 302, 304, 306, and 308 are trained based on the player's gameplay data 310 to perform gameplay of the video game in a style/manner similar to that of the player 122. The different ML models may be trained for different game conditions/situations, different video games, different sections of a video game, different avatars/characters, etc.

Accordingly, the autoplay logic 112 selects a relevant one of the ML models to perform automatic gameplay on behalf of the player 122. In this manner, then gameplay on behalf of the player 122 may continue in a fashion that is similar to or approximates how the player 122 would actually play, despite the loss of network connectivity as previously described. This can provide the other players in the video game session with continuity of gameplay on the part of the player 122, even though the player 122 is not able to actively perform gameplay in the normal sense.

Figure 4:
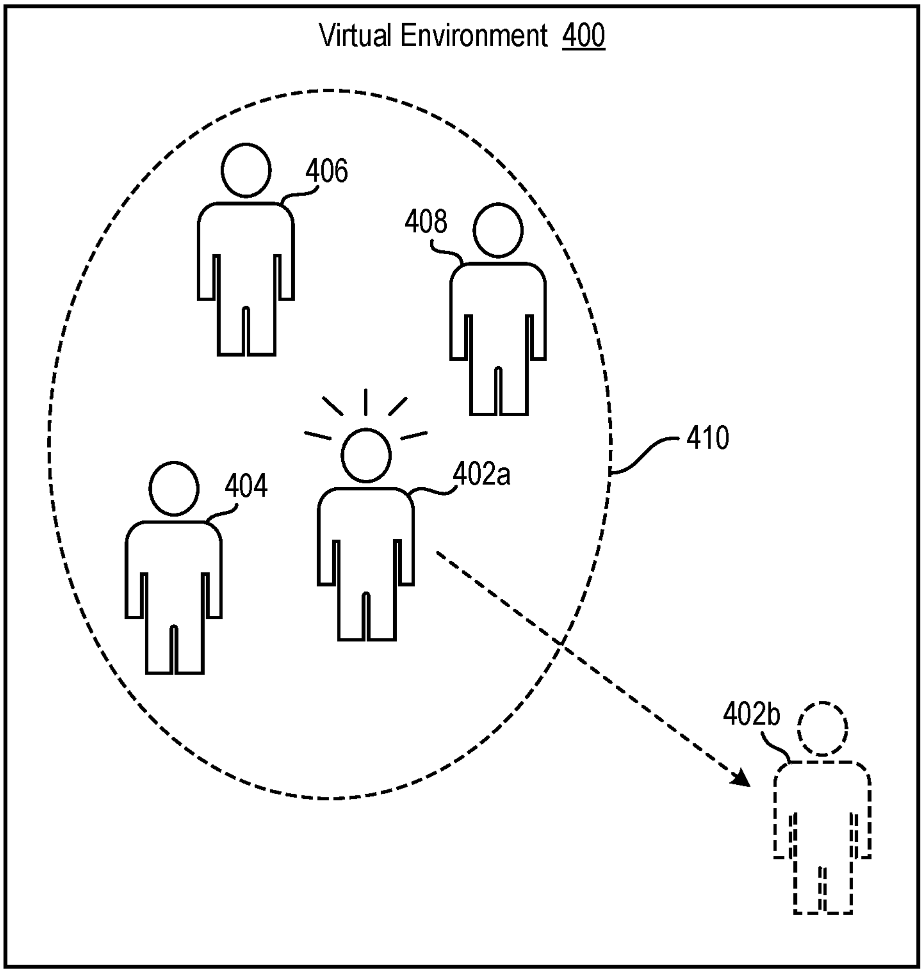
FIG. 4 conceptually illustrates autoplay movement of a player's avatar during loss of network connectivity, in accordance with implementations of the disclosure.

FIG. 4 conceptually illustrates autoplay movement of a player's avatar during loss of network connectivity, in accordance with implementations of the disclosure.

In the illustrated implementation, a virtual environment 400 of the video game session is conceptually shown. The player's avatar 402*a* is shown at a first location within the virtual environment 400 at the time network connectivity is lost, so as to trigger activation of autoplay logic as described previously. In some implementations, when the loss of network connectivity is detected, then the player's avatar 402*a* is rendered in the virtual environment 400 with certain identifying changes in appearance, such as flashing, exhibiting a glow or halo, exhibiting transparency changes, labeling of the avatar, etc. in order to alert other players to the fact that the player has lost network connectivity.

Furthermore, in some implementations, the autoplay logic is configured to cause the player's avatar to move to a different location within the virtual environment 400 based on the gameplay conditions. For example, a region 410 may be identified in which there are several other player avatars 404, 406 and 408, or in which there is intense gameplay activity. In some implementations, the autoplay logic may be configured to move the player's avatar 402*a* away from such activity/conditions to a different location outside of the region 410. In the illustrated implementation, the player's avatar is automatically moved to a second location in the virtual environment shown by the player's avatar 402*b*. In this manner, the player's avatar is moved away from the other players or areas of more intense gameplay activity, so that the player's avatar is less likely to interfere with ongoing gameplay while the player is experiencing lost network connectivity and unable to participate effectively. Also, the player's avatar is more likely to survive while the player is experiencing a loss of network connectivity.

Figure 5:
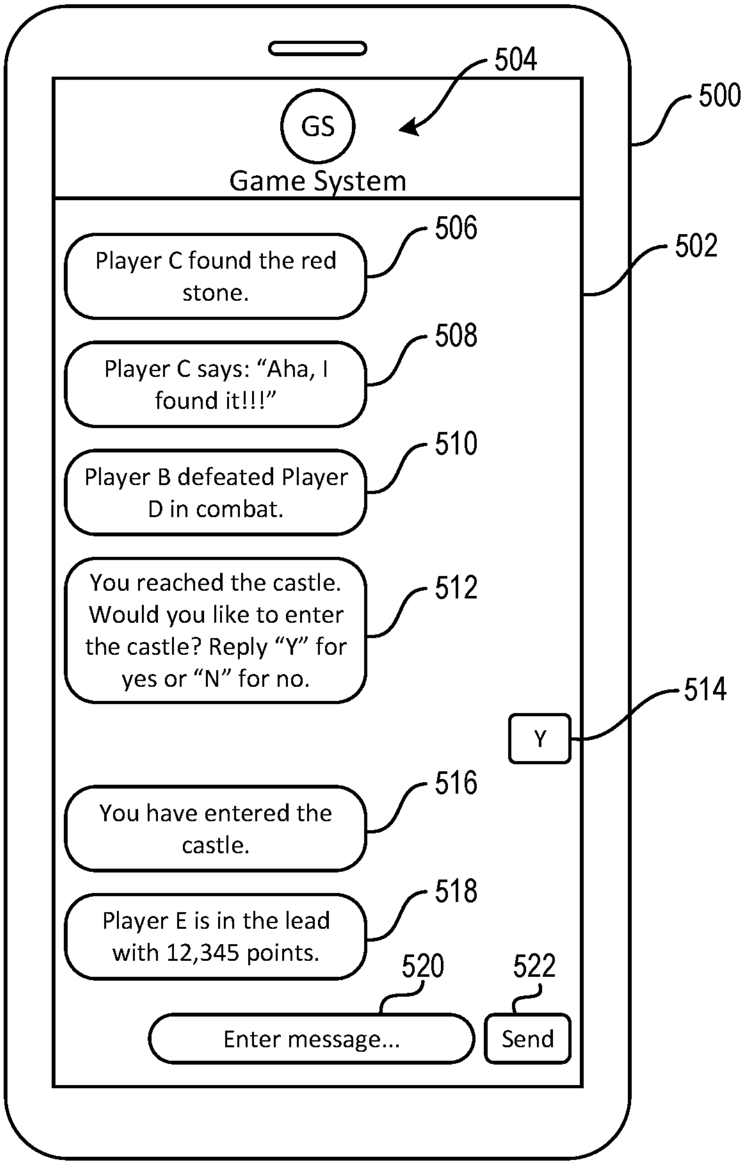
FIG. 5 illustrates messages displayed on a mobile device to provide alternative communication of game updates to a player that has lost regular network connectivity, in accordance with implementations of the disclosure.

FIG. 5 illustrates messages displayed on a mobile device to provide alternative communication of game updates to a player that has lost regular network connectivity, in accordance with implementations of the disclosure.

In the illustrated implementation, a cellular phone 500 is provided having a display 502. In accordance with implementations described above, the player has lost their normal network connectivity to the video game session, and therefore game updates are being transmitted to the player's cellular phone 500 as text messages. In the illustrated implementation, a text messaging thread with the "Game System" 504 is presented on the display 502. For example, a text message 506 indicates that Player C found a specific object in the game. A text message 508 indicates a chat message from Player C. A text message 510 indicates that one player defeated another.

Text message 512 tells the player they have reached a castle, and asks the player whether they would like to enter the castle, further indicating how to reply yes or no to provide instruction. In particular, the player may enter the appropriate text in a text entry field 520 and press the send button 522 to send a reply message. As indicated by text message 514 sent by the player, the player has indicated yes in response to the question posed by text message 512. Accordingly, text message 516 indicates that the player has entered the castle.

Text message 518 indicates that a certain player is in the lead with a certain point total.

Figure 6:
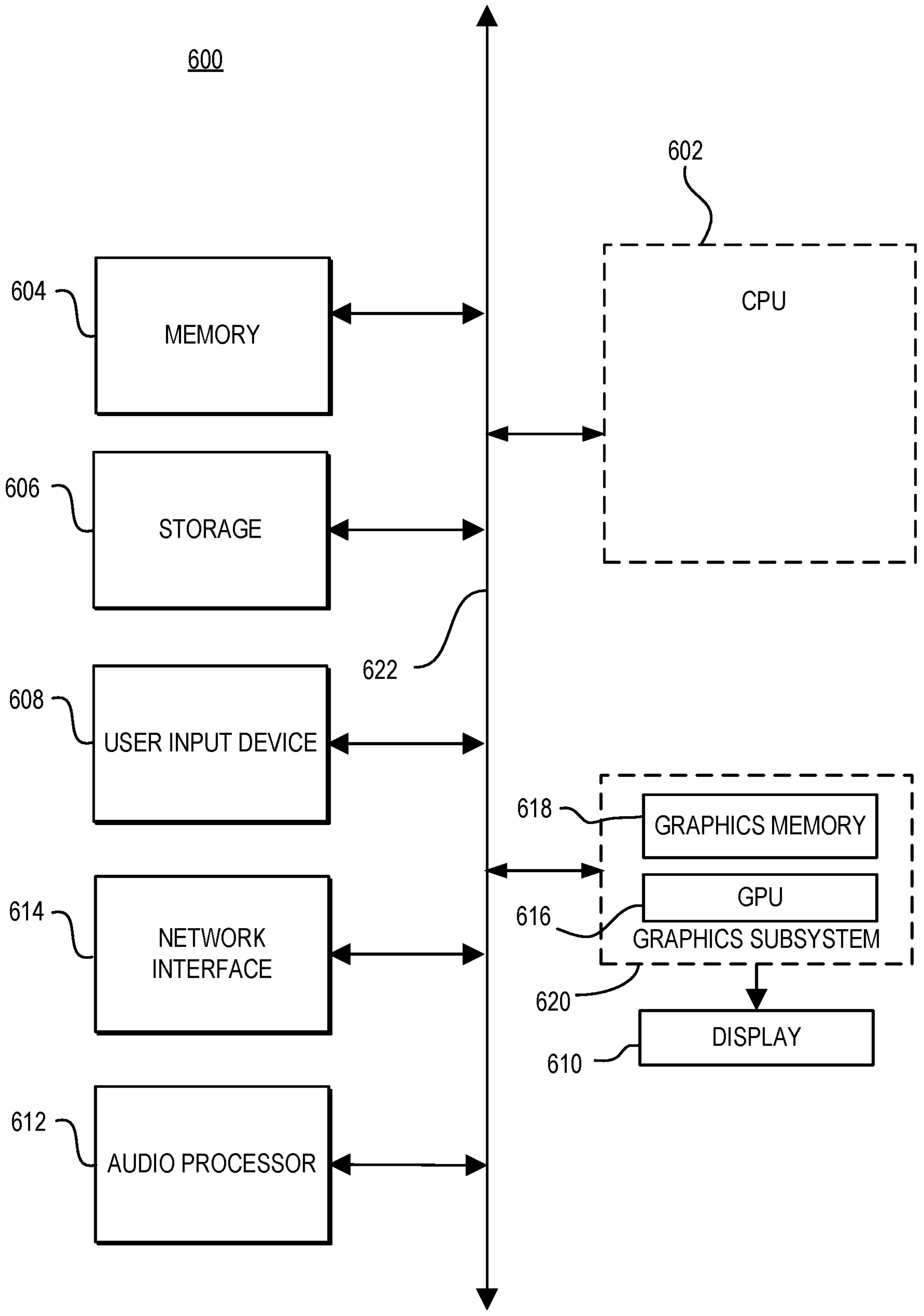
FIG. 6 illustrates components of an example device that can be used to perform aspects of the various embodiments of the present disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be a localized to a player playing a game segment (e.g., game console), or remote from the player (e.g., back-end server processor), or one of many servers using virtualization in a game cloud system for remote streaming of gameplay to clients.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 608, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 614 periodically outputs pixel data for an image from graphics memory 618 to be displayed on display device 610. Display device 610 can be any device capable of displaying visual information in response to a signal from the device 600, including CRT, LCD, plasma, and OLED displays. Device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:

at a server system having one or more processors and memory storing one or more programs that, when executed by the one or more processors, cause the server system to perform operations comprising:

executing a session of a video game by a cloud gaming resource;

streaming video generated by the session over a network to a client device associated with a player of the video game, to enable gameplay of the session by the player;

detecting an instance of loss of network connectivity between the server system and the client device during the session;

responsive to detecting the instance of the loss of network connectivity, then initiating transmission of updates regarding the session, via an alternative communication channel, to a secondary device associated to the player;

further responsive to detecting the instance of the loss of network connectivity, initiating receiving of game commands, via the alternative communication channel, from the secondary device; and applying the game commands in the session to enable continued gameplay by the player during the instance of the loss of network connectivity.

2. The method of claim 1, wherein initiating transmission of the updates includes generating description of gameplay activity occurring in the session during the instance of the loss of network connectivity.

3. The method of claim 2, wherein generating the updates includes detecting predefined gameplay events in the session, and generating messages using corresponding predefined message templates.

4. The method of claim 1, wherein the secondary device is at least one of a cellular phone and a mobile device.

5. The method of claim 4, wherein the alternative communication channel is configured to provide a text messaging service, and the updates include text messages sent via the text messaging service to the secondary device.

6. The method of claim 4, wherein the alternative communication channel is configured to enable messaging via an app installed on the at least one of the cellular phone and the mobile device.

7. The method of claim 1, wherein the session of the video game is defined for multiplayer gameplay, the multiplayer gameplay continuing during the instance of the loss of network connectivity between the server system and the client device during the session.

8. The method of claim 1, further comprising:

further responsive to detecting the instance of the loss of network connectivity, then initiating an autoplay mode to perform automatic gameplay on behalf of the player.

9. The method of claim 8, wherein the autoplay mode is configured to automatically move an avatar of the player away from other avatars in a virtual environment defined by the session.

10. The method of claim 1, wherein the updates include gameplay events requesting player input and wherein the game commands, via the alternative communication channel, include text messages.

11. The method of claim 1, wherein the secondary device is configured based on information of a player account associated with the client device.

12. A non-transitory computer-readable medium having program instructions embodied thereon that, when executed by at least one server computer, cause said at least one server computer to perform operations comprising:

executing a session of a video game by a cloud gaming resource;

streaming video generated by the session over a network to a client device associated with a player of the video game, to enable gameplay of the session by the player;

detecting an instance of loss of network connectivity between the server system and the client device during the session;

responsive to detecting the instance of the loss of network connectivity, then initiating transmission of updates regarding the session, via an alternative communication channel, to a secondary device associated to the player;

further responsive to detecting the instance of the loss of network connectivity, initiating receiving of game commands, via the alternative communication channel, from the secondary device; and applying the game commands in the session to enable continued gameplay by the player during the instance of the loss of network connectivity.

13. The non-transitory computer-readable medium of claim 12, wherein initiating transmission of the updates includes generating description of gameplay activity occurring in the session during the instance of the loss of network connectivity.

14. The non-transitory computer-readable medium of claim 13, wherein initiating transmission of the updates includes detecting predefined gameplay events in the session, and generating messages using corresponding predefined message templates.

15. The non-transitory computer-readable medium of claim 12, wherein the secondary device is at least one of a cellular phone and a mobile device.

16. The non-transitory computer-readable medium of claim 15, wherein the alternative communication channel is configured to provide a text messaging service, and the updates include text messages sent via the text messaging service to the secondary device.

17. The non-transitory computer-readable medium of claim 15, wherein the alternative communication channel is configured to enable messaging via an app installed on the at least one of the cellular phone and the mobile device.

18. The non-transitory computer-readable medium of claim 12, wherein the session of the video game is defined for multiplayer gameplay, the multiplayer gameplay continuing during the instance of the loss of network connectivity between the server system and the client device during the session.

19. The non-transitory computer-readable medium of claim 12, further comprising:

further responsive to detecting the instance of the loss of network connectivity, then initiating an autoplay mode to perform automatic gameplay on behalf of the player.

20. The non-transitory computer-readable medium of claim 19, wherein the autoplay mode is configured to automatically move an avatar of the player away from other avatars in a virtual environment defined by the session.

* * * * *